United States Patent [19]
Yazaki et al.

[11] Patent Number: 5,623,639
[45] Date of Patent: Apr. 22, 1997

[54] MEMORY MANAGEMENT SYSTEM FOR THE TIME-WISE MANAGEMENT OF MEMORY

[75] Inventors: Masatomo Yazaki; Jun Nakajima, both of Kawasaki, Japan

[73] Assignee: Fujitsu Limited, Kawasaki, Japan

[21] Appl. No.: 468,185

[22] Filed: Jun. 6, 1995

Related U.S. Application Data

[63] Continuation of Ser. No. 946,834, Sep. 21, 1992, abandoned.

[30] Foreign Application Priority Data

Sep. 20, 1991 [JP] Japan ................................. 3-240772

[51] Int. Cl.⁶ ...................................................... G06F 12/08
[52] U.S. Cl. ........................ 395/494; 395/405; 395/485; 395/490; 395/497.04
[58] Field of Search ................................... 395/405, 485, 395/490, 494, 497.04, 550, 650

[56] References Cited

U.S. PATENT DOCUMENTS

| | | | |
|---|---|---|---|
| 4,951,195 | 8/1990 | Fogg, Jr. et al. | 364/200 |
| 5,006,992 | 4/1991 | Skeirik | 364/513 |
| 5,148,542 | 9/1992 | Sakuma et al. | 395/800 |
| 5,167,023 | 11/1992 | de Nicolas et al. | 395/375 |
| 5,220,420 | 6/1993 | Hoarty et al. | 358/86 |
| 5,224,210 | 6/1993 | Pinedo et al. | 395/164 |
| 5,255,211 | 10/1993 | Redmond | 364/578 |
| 5,261,041 | 11/1993 | Susman | 395/135 |
| 5,265,248 | 11/1993 | Moulios et al. | 395/650 |
| 5,291,614 | 3/1994 | Baker et al. | 395/800 |
| 5,295,064 | 3/1994 | Malec et al. | 364/401 |
| 5,361,091 | 11/1994 | Hoarty et al. | 348/7 |

*Primary Examiner*—Reba I. Elmore
*Attorney, Agent, or Firm*—Staas & Halsey

[57] ABSTRACT

The present invention relates to a time management system for a memory for processing a time-series data, such as animation image and a sound data. The time-series data is managed on a timewise basis so that it is possible to transfer the time-series data into a real memory without a swap-out/swap-in operation. The present invention includes a memory unit 5, a time measuring unit 3 including a time managing table 31 to manage a timing for acquisition/release of an area in the memory unit, and an area managing unit 4 including a user area time managing table 41 to manage the memory unit on a timewise basis in accordance with an area acquisition signal and an area release signal transferred from the time measuring unit. When the time measuring unit 3 detects a designated time, it requests an acquisition of the memory unit from the area managing unit 4, and when the time measuring unit 3 detects a time-out of the designated time, it sends a release of the memory unit request to the area managing unit 4.

2 Claims, 10 Drawing Sheets

Fig. 2

TIME MANAGING TABLE

| ID | TIME-OUT (ms) | FACTOR | DESTINATION |
|---|---|---|---|
| id-1 | 20 | AREA ACQUISITION | AREA MANAGING UNIT |
| id-2 | | | |

Fig. 3

USER AREA TIME MANAGING TABLE

| USER NUMBER | ID | ABSOLUTE TIME | start-time | OCCUPATION TIME | addr | size(byte) | status |
|---|---|---|---|---|---|---|---|
| | | | | TIME UNIT ms | | | |
| user1 | id-1 | 0 | 20 | 100 | 0x10000 | 0x1000 | AREA ACQUISITION |
| user2 | id-2 | | | | | | |

Fig. 5(A)

USER AREA TIME MANAGING TABLE (0ms)

| USER NUMBER | ID | ABSOLUTE TIME | TIME UNIT ms | | | | |
|---|---|---|---|---|---|---|---|
| | | | start-time | OCCUPATION TIME | addr | size(byte) | status |
| user1 | id-1 | 0 | 20 | 100 | 0x10000 | 0x1000 | AREA ACQUISITION |

Fig. 5(B)

TIME MANAGING TABLE (0ms)

| ID | TIME-OUT (ms) | FACTOR | DESTINATION |
|---|---|---|---|
| id-1 | 20 | AREA ACQUISITION | AREA MANAGING UNIT |

Fig. 6(A)

USER AREA TIME MANAGING TABLE (10ms)

| USER NUMBER | ID | ABSOLUTE TIME | start-time | OCCUPATION TIME | addr | size(byte) | status |
|---|---|---|---|---|---|---|---|
| user1 | id-1 | 0 | 20 | 100 | 0x10000 | 0x1000 | AREA ACQUISITION |
| user2 | id-2 | 10 | 200 | 500 | 0x10000 | 0x1000 | AREA ACQUISITION |

TIME UNIT ms

Fig. 6(B)

TIME MANAGING TABLE (10ms)

| ID | TIME-OUT (ms) | FACTOR | DESTINATION |
|---|---|---|---|
| id-1 | 10 | AREA ACQUISITION | AREA MANAGING UNIT |
| id-2 | 200 | AREA ACQUISITION | AREA MANAGING UNIT |

Fig. 7(A)

USER AREA TIME MANAGING TABLE (20ms)

TIME UNIT ms

| USER NUMBER | ID | ABSOLUTE TIME | start-time | OCCUPATION TIME | addr | size(byte) | status |
|---|---|---|---|---|---|---|---|
| user1 | id-1 | 0 | 20 | 100 | 0x10000 | 0x1000 | AREA RELEASE |
| user2 | id-2 | 10 | 200 | 500 | 0x10000 | 0x1000 | AREA ACQUISITION |

Fig. 7(B)

TIME MANAGING TABLE (20ms)

| ID | TIME-OUT (ms) | FACTOR | DESTINATION |
|---|---|---|---|
| id-1 | 100 | AREA RELEASE | AREA MANAGING UNIT |
| id-2 | 190 | AREA ACQUISITION | AREA MANAGING UNIT |

Fig. 8(A)

USER AREA TIME MANAGING TABLE (120ms)

| USER NUMBER | ID | TIME UNIT ms ||||| 
|---|---|---|---|---|---|---|
| | | ABSOLUTE TIME | start-time | OCCUPATION TIME | addr | size(byte) | status |
| user2 | id-2 | 10 | 200 | 500 | 0x10000 | 0x1000 | AREA ACQUISITION |

Fig. 8(B)

TIME MANAGING TABLE (120ms)

| ID | TIME-OUT (ms) | FACTOR | DESTINATION |
|---|---|---|---|
| id-2 | 90 | AREA ACQUISITION | AREA MANAGING UNIT |

Fig. 9(A)

USER AREA TIME MANAGING TABLE (210ms)

| USER NUMBER | ID | TIME UNIT ms | | | | |
|---|---|---|---|---|---|---|
| | | ABSOLUTE TIME | start-time | OCCUPATION TIME | addr | size(byte) | status |
| user2 | id-2 | 10 | 200 | 500 | 0x10000 | 0x1000 | AREA RELEASE |

Fig. 9(B)

TIME MANAGING TABLE (210ms)

| ID | TIME-OUT (ms) | FACTOR | DESTINATION |
|---|---|---|---|
| id-2 | 500 | AREA RELEASE | AREA ACQUISITION |

Fig. 10

FILE MANAGING INFORMATION
OF TIME-SERIES DATA

| |
|---|
| FILE NAME (SOUND DATA) <br> FILE AIZE (400Kbyte) |
| ---------- |
| BASIC TAME (20ms) <br> AMOUNT OF DATA IN BASIC TAME (4Kbyte) <br> TIME FILE SIZE (2s) |
| DATA |

MEMORY MANAGEMENT SYSTEM FOR THE TIME-WISE MANAGEMENT OF MEMORY

This application is a continuation of application Ser. No. 07/946,834, filed Sep. 21, 1992, now abandoned.

BACKGROUND OF THE INVENTION

1. Field of the Invention

The present invention relates to a time management system for a memory device processing time-series data, such as animated images and sound data.

2. Description of the Related Art

Recently, computer systems have become multimedia (for example, handling text data, still image data, animated image data, sound data, and the like). Accordingly, it is required that an operating system in such a computer system support multimedia functions.

To cope with these requirements, operating systems having a "multithread" function are advantageous for controlling synchronization between different media. When this operating system processes the time-series data of, for example, animated image data, sound data, etc., the operation system handles the time-series data in such a way that either all of huge amount of time-series data is stored in a real memory of the computer system, or data which are intentionally separated by the operating system is stored in the real memory.

In general, when processing time-series data, it is not necessary to have immediate access to all of the time-series data, it is sufficient to have some of the time-series data for a predetermined time and some time before/after the predetermined time. Accordingly, it is sufficient to store only the required time-series data into the real memory. That is, it is not necessary to provide old data previously used, i.e., from a past time. Therefore, to effectively utilize a data area on the real memory, it is necessary to effectively manage, on a timewise basis, the data area of the real memory.

SUMMARY OF THE INVENTION

The object of the present invention is to provide a time management system for memory in which time-series data such as animation data, sound data, and the like, is managed on a timewise basis and is transferred to a real memory without need for a swap-out and swap-in operation.

The time management system for memory according to the present invention includes a memory unit, a time measuring unit having a time managing table to manage a timing of acquisition/release of an area of the memory unit, and an area managing unit having a user area time managing table for managing on a timewise basis the memory unit based on an area acquisition signal and an area release signal transferred from the time measuring unit, wherein, when the time measuring unit detects a designated time, it directs acquisition of the memory unit to the area managing unit, and when the time measuring unit detects a passage of the designated time, it directs a release of the memory unit.

Further, the time management system for a memory according to the present invention includes a memory unit, a time measuring unit having a time managing table to manage a timing of acquisition/release of an area of the memory unit, and a time-series data control unit for controlling an amount of data and a transfer timing of the time-series data transferred from a secondary storage unit to the memory unit, wherein, the time measuring unit measures an elapsed time in accordance with the timing calculated by the time-series data control unit, and when the time measuring unit detects a designated time, it directs an update of the time-series data of a designated memory area to the time-series data control unit.

Still further, the time management system for a memory according to the present invention includes a memory unit, a time measuring unit having a time managing table to manage a timing of acquisition/release of an area of the memory unit, an area managing unit having a user area time managing table for managing on a timewise basis the memory unit based on an area acquisition signal and an area release signal from the time measuring unit, and a time-series data control unit for controlling an amount of data and a transfer timing of the time-series data transferred from a secondary storage unit to the memory unit, wherein, the time measuring unit measures an elapsed time in accordance with the timing calculated by the time-series data control unit, when the time measuring unit detects a designated time, it instructs an acquisition of the memory unit to the area managing unit, and when the time measuring unit detects a passage of the designated time, it instructs a release of the memory unit.

BRIEF DESCRIPTION OF THE DRAWINGS

In the drawing:

FIG. 2 shows a time managing table used for the present invention;

FIG. 3 shows a user area time managing table used for the present invention;

FIG. 5A shows a user area time managing table indicating a table state at the time 0 ms;

FIG. 5B shows a time managing table indicating a table state at the time 0 ms;

FIG. 6A shows a user area time managing table indicating a table state at the time 10 ms;

FIG. 6B shows a time managing table indicating a table state at the time 10 ms;

FIG. 7A shows a user area time managing table indicating a table state at the time 20 ms;

FIG. 7B shows a time managing table indicating a table state at the time 20 ms;

FIG. 8A shows a user area time managing table indicating a table state at the time 120 ms;

FIG. 8B shows a time managing table indicating a table state at the time 120 ms;

FIG. 9A shows a user area time managing table indicating a table state at the time 210 ms;

FIG. 9B shows a time managing table indicating a table state at the time 210 ms; and FIG. 10 is a schematic of file managing information of the time-series data.

DESCRIPTION OF THE PREFERRED EMBODIMENTS

In a conventional process of handling time-series data in a computer system, after an area for the time-series data is newly acquired in a real memory, as in normal process for text data, either all of the time-series data is stored in the real memory, or time-series data, intentionally separated by an application program, i.e., a "page" is stored in the real memory.

However, in a multimedia computer system since a plurality of processes are executed in a limited memory capacity, all data or a part of the data stored in the real memory becomes an object of a swap-out operation to a secondary storage unit (for example, a disk) when the process is changed.

In the above case, when a predetermined page, which is swapped-out in above step, is accessed again in a next process, a "page-out" occurs in this process so that the corresponding page must be swapped-in from the secondary storage unit. Accordingly, there is a problem in that target data cannot be immediately accessed.

In the case where all time-series data are stored in the real memory, a memory area for the time-series data becomes very large since a huge amount of time series data must be stored therein. Accordingly, access operations for this memory by other processes becomes worse.

Still further, when the time-series data intentionally separated by an application program is stored in the real memory, multiple accesses are required to acquire the data needed for process so that it is difficult to immediately access specific target data during the above process.

Accordingly, in the conventional art, it is difficult to immediately an access the data. For example, when outputting sound data, if the time required for accessing a next sound data is excessive, the sound output is interrupted.

The object of the present invention is to provide a time management system for memory in which time-series data, such as animation data, sound data, and the like, is managed on a timewise basis and transferred to a real memory without a swap-out and swap-in operation.

Figure 1:
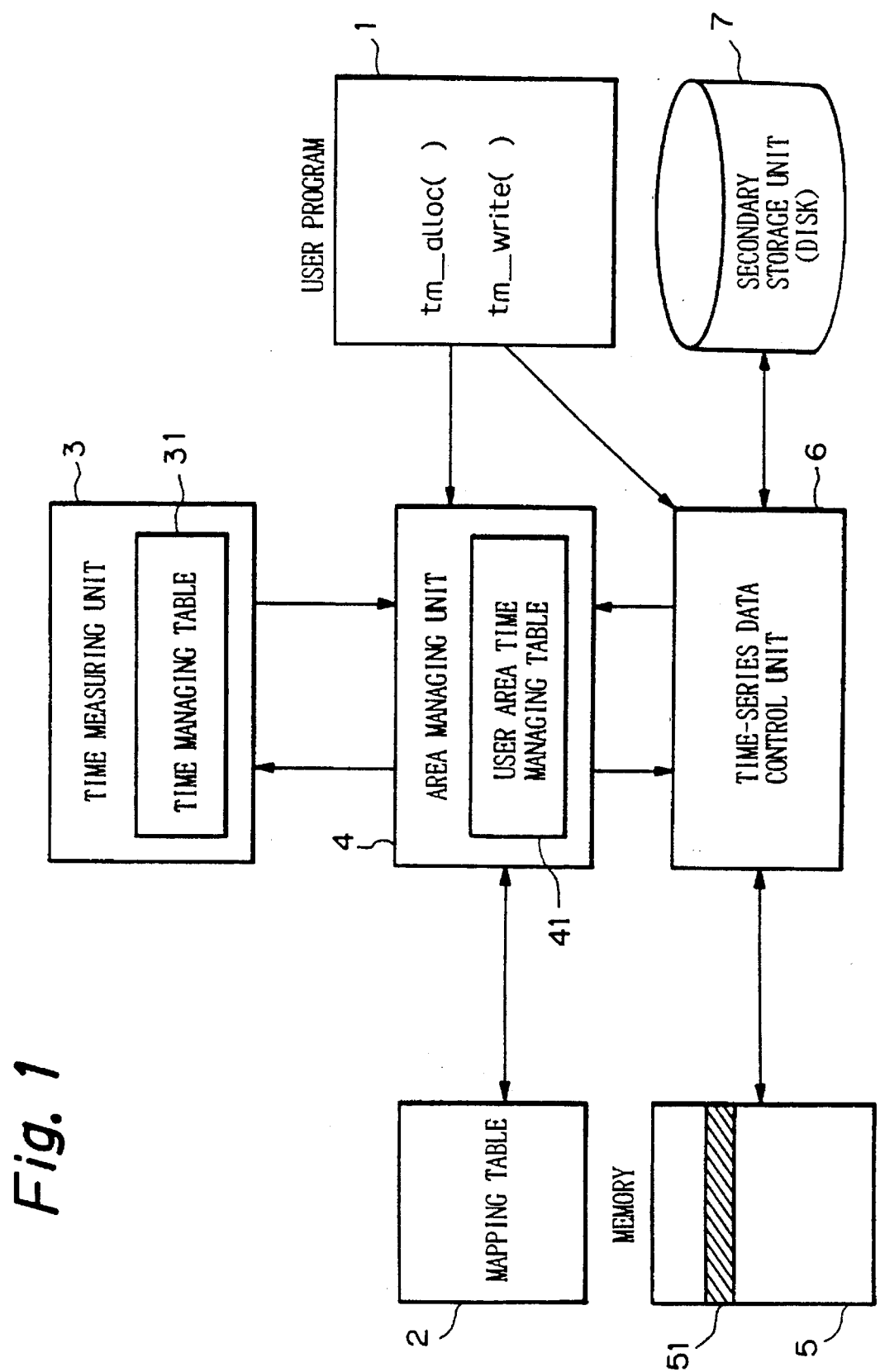
FIG. 1 is a block diagram of the present invention.

FIG. 1 is a block diagram of the present invention. In FIG. 1, block 1 is a user program requiring timewise use of the memory during the processing, and which is one of a plurality of programs being processed. Block 2 is a mapping table for mapping a logical space for each user process in a physical memory.

Block 3 is a time measuring unit, having a time managing table 31 therein, for measuring the time registered therein. The time managing table 31, as shown in FIG. 2, registers a time-out, a factor and a destination for every ID (id-1, id-2), where the ID denotes a unique number for distinguishing requests from the user programs. The time-out denotes the time detected in the time measuring unit 3. The factor denotes an information content. The destination denotes the place where the time measuring unit 3 informs when it detects the time-out.

Block 4 is an area managing unit, for managing the memory on a timewise basis, and has a user area time managing table 41 for storing user requests. Further, the area managing unit 4 performs an operation corresponding to the content of the information in the mapping table 2 in accordance with the information (an acquisition/release) from the time measuring unit 3. The user area time managing table 41, as shown in FIG. 3, is a table for registering a user number, an ID, an absolute time, a start-time, an occupation time, an address "addr", a size "size", and a status "status" for each user.

In the user area time managing table 41, the user's number denotes a particular number of a user to allow the retrieval of the mapping table 2 of a user who requested access. The ID denotes a unique identification number identifying an access request from a user program. The absolute time denotes a time which the system indicates that a request from a user program is generated. The start-time denotes a wait time measured from the request of a user until a start of acquisition of an area. The occupation time denotes a time during which the acquired memory is occupied. The "addr" denotes a head address of the memory area to which the user requested acquisition. The "size" denotes the size of the memory area which the user requests to acquire. The "status" denotes processing content when the time-out information is received from the time measuring unit 3.

Reference number 5 denotes a memory for storing the time-series data read from a time-series data control unit 6. The time-series data control unit takes data from a secondary storage unit 7 (disk) which stores the time-series data, and undates the data of the memory area 51 of the memory 5 in accordance with the information from the time measuring unit 3 or the area managing unit 4.

In the above structure, when a user program performs a request operation, which requires timewise acquisition of the designated memory area 51, to the area managing unit 4 in accordance with an instruction code "tm-alloc( )", the area managing unit 4 registers: in the user area time managing table 41 (FIG. 3) the ID, to identify the request; the absolute time of the system at the time of the request; the "start-time", indicating the start time of the acquisition of the memory area; the occupation time of the memory area the address "addr" the size of the data; and the "status" of the data Further, the area managing unit 4 registers the ID, the time-out at that time, the factor of the time-out (area acquisition/area release) and the destination in the time managing table 31 (FIG. 2) of the time measuring unit 3.

The time measuring unit 3 measures the time-out registered into the time managing table 31 of the time managing unit 3. When the time-out occurs, the time measuring unit 3 transmits the ID for which the time-out occurs, and the factor for which the time-out occurs to this area managing unit 4.

The area managing unit 4 which receives the ID and the factor, based on the ID obtains the user number by retrieving the user area time managing table 41. Based on the user number, the area managing unit 4 further obtains the mapping table 2 of the user which becomes an object of the operation. Further, the area managing unit 4 performs the operation corresponding to the factor (area acquisition/area release) on the corresponding memory area of the mapping table 2. As a result, it is possible to manage the memory area on a timewise basis.

The destination of the time managing table 31 of the time measuring unit 3 is the time-series data control unit 6. When the factor of the information is registered as an "area update", the time-series data control unit 6 receives a timing signal for the update of the memory area from the time measuring unit 3 so that the content of the memory area 51 (slant portion) is updated at a predetermined timing.

The information factor transferred from the time-series data control unit 6 to the time measuring unit 3 specifies "area acquisition" and "area update". The timing between the "area acquisition" and the "area update" is synchronized based on an operation in connection with the time series data control unit 6 and the area managing unit 4. Further, after the time-series data control unit 6 acquires the memory area 51 based on the instruction of the area acquisition, the user program causes the time-series data control unit 6 to update the area. Accordingly, it is possible to automatically transfer the object time-series data to the memory area 51.

However, the conventional memory management system does not include a time managing table 31 or an user area time managing table 41. When it receives an acquisition request from the user, it searches a vacant area in the memory 5 and only writes the acquisition request into the mapping table 2. Accordingly, when there is no vacant area in the memory 5, it is necessary to provide for the swap-out and swap-in operation.

The present invention manages the memory area 51, to be acquired on a timewise basis, by using the time managing table 31 and the user area time managing table 41. Further, the acquisition request is controlled without overlapping, on a timewise basis so that it is not necessary to provide a swap-out and swap-in operation.

Figure 4:
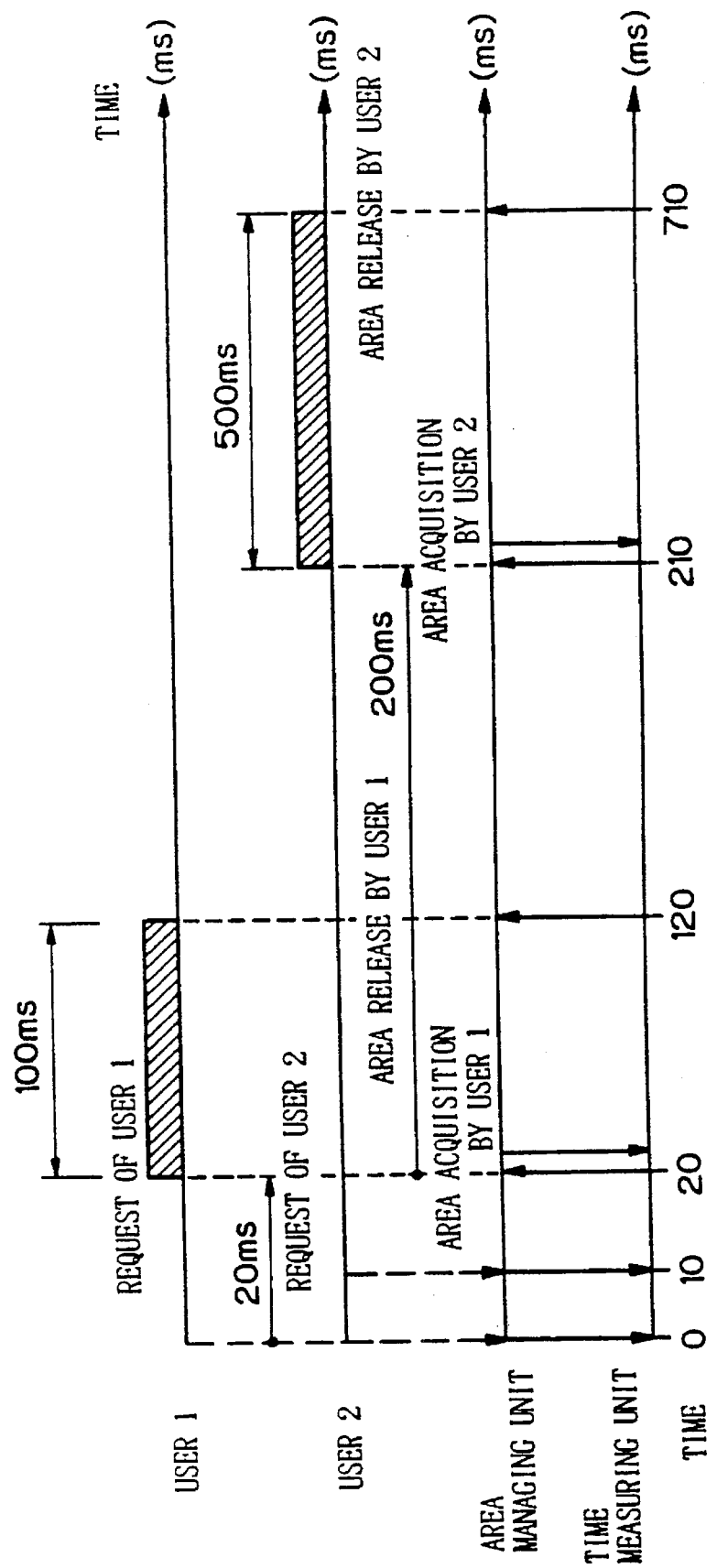
FIG. 4 is a timing chart for an acquisition of an area according to an embodiment of the present invention.

FIG. 4 shows a timing chart which denotes the operation of the area acquisition in a case where a user 1 and user 2 send the requests in a time interval of 10 ms to the area managing unit 4. Specifically, the requests of:

(1) User 1 requests acquisition of a memory space of size "0×1000" from the address "0×10000" during an interval 100 ms after the time 20 ms from the generation of the request; and (2) User 2 requests the acquisition of a memory space of the size "0×1000" from the address "0×10000" during an interval 500 ms after the time 200 ms from the generation of the request.

When the acquisition request for memory is sent from the user program 1, the area managing unit 4 investigates as to whether or not there is another entry which overlaps the address "0×10000" in accordance with the user area time managing table 41.

If an entry overlaps the address, the area managing unit 4 returns an error signal indicating "no vacant area" to the time-series data control unit 6. If an entry does not overlap the address "0×10000", the area managing unit 4 directs a time-out of 20 ms, which directs the start time of occupation of the memory area by the user 1, to the time measuring unit 3 of FIG. 3, and registers the "area acquisition" in the user area time managing table 41.

FIG. 5A shows the state of the user area time managing table 41 at 0 ms, and FIG. 5B shows the state of the time managing table 31 at 0 ms.

The time measuring unit 3 starts the measurement of the time-out by subtracting the elapsed time of the user 1 at every 1 ms in accordance with the time managing table 31.

When the acquisition request for the memory is transferred from the user program 2, the area managing unit 4 determines whether or not there is another entry which overlaps the address "0×10000" in accordance with the user area time managing table 41.

In this case even though the memory area requested by the user 2 is the same address space as that of the memory area requested by the user 1, as shown in FIG. 4, the occupation time for the memory, 100 ms from the time 20 ms in the case of the user 1, and 500 ms from the time 210 ms in the case of the user 2. Accordingly, the occupation times do not overlap each other and as such do not present a conflict.

Accordingly, the area managing unit 4, which received the acquisition request for the memory area from the user 2, directs the time-out of 200 ms, which directs the start time of the occupation for the memory by the user 2, to the time measuring unit 3, and registers the "area acquisition" into the user area time managing table 41.

The state of the user area time managing table 41 and the time managing table 31 for the request by the user 1 at 10 ms is shown in FIGS. 6A and 6B.

In the time managing table 31 of FIG. 6B, the time-out of the ID=id-1 (user 1) becomes 10 ms since the elapsed time is subtracted from the time 20 ms (as shown in FIG. 5B).

When the time measuring unit 3 indicates that 20 ms has elapsed, it detects the passage of the 20 ms time-out for the user 1, and transmits this to the area managing unit 4. When the area managing unit 4 receives the time-out information, since the "status" of the user 1 of the user area time managing table 41 (see, FIG. 6A) is the "area acquired", the area managing unit 4 maps the address "0×10000" as entered in the user area time managing table 41 in the mapping table 2.

After the mapping operation, the area managing unit 4 directs the occupation time of 100 ms, for the memory area as the time-out of the user 1, to the time measuring unit 3. The area managing unit 4 further registers an "area release" to the "status" in the user 1 of the user area time managing table 41. The state of the user area time managing table 41 and the time managing table 31 at 20 ms is shown in FIGS. 7A and 7B, respectively.

Based on the above operation, the memory area 51 requested by the user 1 is acquired on a timewise basis.

FIGS. 8A and 8B show the user area time managing table and the time managing table at 120 ms.

When the time reaches 120 ms, the time measuring unit 3 performs the time-out of the occupation time set to 100 ms, and informs the area managing unit 4. When the area managing unit 4 receives the time-out information, since the "status" of the user 1 in the user area time managing table 41 (see, FIG. 7A) is "area release", the area managing unit 4 deletes the acquisition request address of the user 1, entered in the user area time managing table 41 from the mapping table 2. At the same time, the area managing unit 4 deletes all registered information regarding the user 1 from the user area time managing table 41 and the time managing table 31. The state of the user area time managing table 41 and the time managing table 31 at 120 ms is shown in FIGS. 8A and 8B, respectively.

When the time reaches 210 ms, the time measuring unit 3 detects the passage of the 200 ms time-out of the user 1, and informs the area managing unit 4. When the area managing unit 4 receives the time-out information, since the "status" of the user 2 in the user area time managing table 41 (see, FIG. 8A) is "area acquired", the area managing unit 4 maps the address "0×10000," entered in the user area time managing table 41, in the mapping table 2.

After the above mapping operation, the area managing unit 4 directs the occupation time of 500 ms, for the memory area as the time-out of the user 2, to the time measuring unit 3, and registers "area release" as the "status" in the user 2 of the user area time managing table 41. The state of the time managing table 41 and the time managing table 31 at the time 210 ms is shown in FIGS. 9A and 9B, respectively.

Based on the above operation, the memory area 51 requested by the user 1 is acquired on a timewise basis.

When the time reaches to 210 ms, the time measuring unit 3 causes the time-out of the occupation time 500 ms, and informs the area managing unit 4. When the area managing unit 4 receives the time-out information, since the "status" of the user 2 in the user area time managing table 41 (see, FIG. 9A) is "area release", it deletes the acquisition request address of the user 2, entered in the user area time managing table 41, from the mapping table 2 at the same time, the area managing unit 4 deletes all registered information regarding the user 2 from the user area time managing table 41 and the time managing table 31.

All items in the user area time managing table 41 and the time managing table 31 are thus returned to a blank state, and the sequential acquisition of the memory is finished.

In the first embodiment explained above, the time-out of the time managing table 31 is calculated by a subtracting operation, however, it may be calculated using absolute time. Further, the time measuring unit 3 may be provided in either the same processor or in another processor connected through a network. The time measuring unit 3 may also be provided as dedicated hardware to increase the precision of time measurement.

In a second embodiment according to the present invention, a time-series data control unit 6 transfers time-series data from a secondary storage unit (disk) 7 to an acquired memory area. The management of the memory area uses the same method as in the first embodiment, but the time-series data control unit 6 directly receives the memory acquisition information from the time measuring unit 3 and transfers the data to the memory area 51.

The memory area 51 is acquired by the same method as the first embodiment. Assuming that a transfer request at a certain timing for a fixed byte of a data file on the secondary storage unit (disk) 7 is represented by "tm-write ( )", the time-series data control unit 6, which receives this transfer request, directs the designated transfer timing to the time measuring unit 3. At this time, the time measuring unit 3 sets the factor to "area update" and sets the destination to "time-series data control unit 6", and registers the factor and destination in the time managing table 31.

When the time measuring unit 3 detects the designated transfer timing, it sends the "area update" information to the time-series data control unit 6. When the time- series data control unit 6 receives the information, it transfers the data having the size designated by the secondary storage unit (disk) 7 to the corresponding memory area 51.

In this case, the correspondence of the information from the time measuring unit 3 and the memory area 51, which is to be processed as in the first embodiment, is managed by ID. Further, until the memory area is released, the time measuring unit 3 registers the transfer timing, and transfers the data when it receives the information of the transfer. These steps are repeated to transfer the time-series data.

In the above second embodiment, the data transfer to the memory area 51 is performed by designating the timing for updating the data, the data file to be transferred, and the data length for one transfer, to the time-series data control unit 6. On the other hand, as shown in FIG. 10, in accordance with a third embodiment of the present invention, file managing information of the time-series data can be previously stored in a file header portion of the data file. In this case, the file managing information includes a basic time unit for the transfer, the data amount to be transferred within the time unit, and the file size counted from the above (for example, as in FIG. 10, where: the basic time unit is 20 ms, the data amount of 4 kbyte transferred within the time unit, and the file size of 2 sec). Based on the stored data, the time-series data control unit 6 calculates the transfer timing and each parameter of the amount of the data transfer.

The time-series data control unit 6 calculates the transfer timing and the amount of data to transfer in accordance with the memory area 51 as follows.

transfer timing=(memory area of destination/amount of data for basic time)×basic time amount of data to transfer=(transfer timing/basic time)× amount of data for basic time For example, assuming that the memory area 51 of the destination is 8 kbyte and the file shown in FIG. 10 is to be transferred, the transfer time is 40 ms and the amount of data transferred is 8 kbyte. That is, the time-series data control unit 6 transfers 8 kbyte of the time-series data to the designated memory area for every 40 ms.

In the above second and third embodiments, the data of the previously acquired and fixed memory area 51 is updated. In the fourth embodiment of the present invention, memory areas are sequentially acquired on a timewise basis and the updating operation is performed by using these memory areas. The time-series data control unit 6, which received the request "tm-write ( )", directs the instruction to the area managing unit 4 so as to acquire the designated area for the designated time. At that time, the occupation time of the memory area to be acquired may be set to the time occurring next area acquisition (transfer timing).

In the fourth embodiment, the area managing unit 4, which receives the instruction for the area acquisition, performs the same operation as the first embodiment, and registers the "area acquisition" and the "area update" as the factor to the time measuring unit 3. The time measuring unit 3 also performs the same operation as in the first embodiment in that it sends the "area acquisition" and in the "area update" information to the area managing unit 4 when the previously set timing is detected.

When the area managing unit 4 receives this information, it acquires the memory area and sends the address of the memory area and the information of the area update to the time-series data control unit 6. The time-series data control unit 6 performs the same operation as in the second embodiment in that it transfers the data to the acquired memory area so that memory area is updated. The memory area is released when the occupation time is over, the time-series data control unit 6 acquires the memory area in response to a next update timing.

As is obvious from the above explanation, the present invention is very effective for improvement of performance of an operating system for a multimedia system.

Further, it is possible to effectively utilize a memory area for time-series data.

It is also not necessary to perform inefficient swap-out/ swap-in operations during the transfer timing of the time-series data.

It also allows efficient and effective development of application programs since the timing is not necessary when the time-series data is stored in the real memory.

We claim:

1. A time management system for a memory comprising, a memory unit;

a time measuring unit including a time managing table having at least time-out information and acquisition/ release information to manage timing for acquisition and release of an area in the memory unit; and an area managing unit including a user area time managing table having at least address and required size information of a memory area to manage the memory unit on a timewise basis in accordance with the time managing table, the time measuring unit directing an acquisition request for the memory unit to the area managing unit when the time-out information indicates time-out status and the acquisition/release information indicates acquisition status, and directing a release request for the memory unit to the area managing unit when the time-out information indicates time-out status and the acquisition/release information indicates release status, the time managing table generating an error signal when a request for an area of memory overlaps, on a timewise basis, with another request for the area of memory.

2. A time management system for managing data and time-series data in a memory comprising, a memory;

a secondary storage unit;

a time measuring unit including a time managing table having at least time-out information and acquisition/release information to manage timing for acquisition and release of an area in the memory unit;

an area managing unit including a user area time managing table having at least address and required size information of a memory area to manage the memory unit on a timewise basis in accordance with the time managing table;

a time-series data control unit for controlling an amount of data and calculating the timing of a transfer of the time-series data from the secondary storage unit to the memory unit, the time measuring unit measuring a time elapsed in accordance with the timing calculated by the time-series data control unit, directing an acquisition request for the memory unit to the area managing unit when the time-out information indicates time-out status and the acquisition/release information indicates acquisition status, and directing a release request for the memory unit to the area managing unit when the time-out information indicates time-out status and the acquisition/release information indicates release status, the time managing table generating an error signal when a request for an area of memory overlaps, on a timewise basis, with another request for the area of memory.

* * * * *